(12) United States Patent
Fenn et al.

(10) Patent No.: US 12,187,904 B2
(45) Date of Patent: Jan. 7, 2025

(54) COREACTIVE MATERIALS AND METHODS FOR THREE-DIMENSIONAL PRINTING

(71) Applicant: PPG Industries Ohio, Inc., Cleveland, OH (US)

(72) Inventors: David R. Fenn, Allison Park, PA (US); Kurt G. Olson, Gibsonia, PA (US); Reza M. Rock, Pittsburgh, PA (US); Cynthia Kutchko, Pittsburgh, PA (US); Susan F. Donaldson, Allison Park, PA (US); Hao Sun, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/423,798

(22) Filed: Jan. 26, 2024

(65) Prior Publication Data

US 2024/0209224 A1    Jun. 27, 2024

Related U.S. Application Data

(63) Continuation of application No. 18/184,138, filed on Mar. 15, 2023, now Pat. No. 11,920,046, which is a continuation of application No. 17/010,039, filed on Sep. 2, 2020, now Pat. No. 11,634,599, which is a continuation of application No. 16/269,277, filed on Feb. 6, 2019, now Pat. No. 11,028,279, which is a continuation of application No. 15/528,205, filed as application No. PCT/US2015/062297 on Nov. 24, 2015, now Pat. No. 10,253,195.

(60) Provisional application No. 62/158,588, filed on May 8, 2015, provisional application No. 62/083,472, filed on Nov. 24, 2014.

(51) Int. Cl.
| | | |
|---|---|---|
| *C09D 11/102* | (2014.01) | |
| *B29C 64/112* | (2017.01) | |
| *B33Y 10/00* | (2015.01) | |
| *B33Y 70/00* | (2020.01) | |
| *B33Y 80/00* | (2015.01) | |
| *C08G 18/10* | (2006.01) | |
| *C08G 18/32* | (2006.01) | |
| *C08G 18/38* | (2006.01) | |
| *C08G 18/48* | (2006.01) | |
| *C08G 18/50* | (2006.01) | |
| *C08G 18/73* | (2006.01) | |
| *C08G 18/75* | (2006.01) | |
| *C08G 18/78* | (2006.01) | |
| *C08G 18/79* | (2006.01) | |
| *C08K 3/36* | (2006.01) | |
| *C09D 11/03* | (2014.01) | |
| *C09D 11/30* | (2014.01) | |
| *C09D 11/38* | (2014.01) | |
| *C09D 175/02* | (2006.01) | |
| *B29K 75/00* | (2006.01) | |

(52) U.S. Cl.
CPC .......... *C09D 11/102* (2013.01); *B29C 64/112* (2017.08); *B33Y 10/00* (2014.12); *B33Y 70/00* (2014.12); *B33Y 80/00* (2014.12); *C08G 18/10* (2013.01); *C08G 18/3225* (2013.01); *C08G 18/3228* (2013.01); *C08G 18/3234* (2013.01); *C08G 18/325* (2013.01); *C08G 18/3821* (2013.01); *C08G 18/4854* (2013.01); *C08G 18/5024* (2013.01); *C08G 18/73* (2013.01); *C08G 18/755* (2013.01); *C08G 18/7893* (2013.01); *C08G 18/792* (2013.01); *C08K 3/36* (2013.01); *C09D 11/03* (2013.01); *C09D 11/30* (2013.01); *C09D 11/38* (2013.01); *C09D 175/02* (2013.01); *B29K 2075/02* (2013.01); *C08G 2150/50* (2013.01)

(58) Field of Classification Search
CPC ....... C09D 11/02; B29C 64/112; C08G 18/32; C08G 18/38; C08G 18/48; C08G 18/50; C08G 18/73; C08G 18/78; C08G 18/79; C08K 3/36
USPC ....................................................... 428/195.1
See application file for complete search history.

(56) References Cited

U.S. PATENT DOCUMENTS

| | | |
|---|---|---|
| 1,025,319 A | 5/1912 | Perkins |
| 3,517,082 A | 6/1970 | Cockerham |
| 3,563,957 A | 2/1971 | Beebe |
| 3,799,854 A | 3/1974 | Jerabek |
| 3,919,351 A | 11/1975 | Chang et al. |
| 4,046,729 A | 9/1977 | Scriven et al. |
| 4,147,769 A | 4/1979 | Dea et al. |
| 4,220,679 A | 9/1980 | Backhouse |
| 4,403,003 A | 9/1983 | Backhouse |
| 4,546,045 A | 10/1985 | Elias |
| 4,623,711 A | 11/1986 | Morris et al. |
| 4,645,207 A | 2/1987 | Teramoto et al. |
| 4,681,811 A | 7/1987 | Simpson et al. |
| 4,732,790 A | 3/1988 | Blackburn et al. |
| 4,798,746 A | 1/1989 | Claar et al. |

(Continued)

FOREIGN PATENT DOCUMENTS

| | | |
|---|---|---|
| CA | 2378348 A1 | 2/2001 |
| CA | 2950215 A1 | 12/2015 |

(Continued)

OTHER PUBLICATIONS

"The JEFFAMINE® Polyetheramines," Huntsman, 2007, 6 pages.

(Continued)

*Primary Examiner* — Deve V Hall

(57) ABSTRACT

Methods of printing a three-dimensional object using co-reactive components are disclosed. Thermosetting compositions for three-dimensional printing are also disclosed.

12 Claims, 2 Drawing Sheets

(56) References Cited

U.S. PATENT DOCUMENTS

| | | |
|---|---|---|
| 5,071,904 A | 12/1991 | Martin et al. |
| 5,114,989 A | 5/1992 | Elwell et al. |
| 5,162,388 A | 11/1992 | Primeaux, II |
| 5,262,259 A | 11/1993 | Chou et al. |
| 5,468,802 A | 11/1995 | Wilt et al. |
| 5,583,196 A | 12/1996 | Lehmann et al. |
| 5,777,061 A | 7/1998 | Yonek et al. |
| 6,172,179 B1 | 1/2001 | Zook et al. |
| 6,259,962 B1 | 7/2001 | Gothait |
| 6,281,307 B1 | 8/2001 | Muehlebach et al. |
| 6,454,972 B1 | 9/2002 | Morissette et al. |
| 6,509,418 B1 | 1/2003 | Zook et al. |
| 6,558,753 B1 | 5/2003 | Ylitalo et al. |
| 6,617,413 B1 | 9/2003 | Bruchmann et al. |
| 6,875,800 B2 | 4/2005 | Vanier et al. |
| 6,894,086 B2 | 5/2005 | Munro et al. |
| 7,009,032 B2 | 3/2006 | Bojkova et al. |
| 7,247,596 B2 | 7/2007 | Jialanella et al. |
| 7,390,859 B2 | 6/2008 | Sawant et al. |
| 7,455,804 B2 | 11/2008 | Patel et al. |
| 7,531,117 B2 | 5/2009 | Ederer et al. |
| 7,578,958 B2 | 8/2009 | Patel et al. |
| 7,767,130 B2 | 8/2010 | Elsner et al. |
| 7,875,666 B2 | 1/2011 | Gilmore et al. |
| 7,879,955 B2 | 2/2011 | Rao et al. |
| 7,955,537 B2 | 6/2011 | Ederer et al. |
| 7,957,825 B2 | 6/2011 | Marsh et al. |
| 8,138,273 B2 | 3/2012 | Rao et al. |
| 8,466,220 B2 | 6/2013 | Rao et al. |
| 8,535,463 B2 | 9/2013 | Allen et al. |
| 8,541,513 B2 | 9/2013 | Hobbs et al. |
| 8,729,216 B2 | 5/2014 | Hobbs et al. |
| 8,816,023 B2 | 8/2014 | Anderson et al. |
| 8,876,513 B2 | 11/2014 | Lim et al. |
| 8,883,392 B2 | 11/2014 | Napadensky et al. |
| 8,952,124 B2 | 2/2015 | Rao et al. |
| 8,993,691 B2 | 3/2015 | Anderson et al. |
| 9,079,833 B2 | 7/2015 | Klobes et al. |
| 9,122,819 B2 | 9/2015 | McDowell et al. |
| 9,216,547 B2 | 12/2015 | Elsey |
| 9,370,132 B2 | 6/2016 | Coppola |
| 9,382,640 B2 | 7/2016 | Yamagata |
| 9,422,451 B2 | 8/2016 | Rao et al. |
| 9,452,445 B2 | 9/2016 | Frankenberger |
| 9,540,540 B2 | 1/2017 | Rao et al. |
| 9,650,537 B2 | 5/2017 | Kunc et al. |
| 9,663,619 B2 | 5/2017 | Echigoya et al. |
| 9,708,440 B2 | 7/2017 | Das et al. |
| 9,744,720 B2 | 8/2017 | Napadensky |
| 9,796,858 B2 | 10/2017 | Powell et al. |
| 9,862,059 B2 | 1/2018 | Liebl et al. |
| 9,873,761 B1 | 1/2018 | Das et al. |
| 9,883,711 B2 | 2/2018 | McDowell et al. |
| 9,944,826 B2 | 4/2018 | Czaplewski et al. |
| 9,982,164 B2 | 5/2018 | Rolland et al. |
| 9,992,917 B2 | 6/2018 | Yanke et al. |
| 10,005,294 B1 | 6/2018 | Kanungo et al. |
| 10,016,941 B1 | 7/2018 | Beard et al. |
| 10,059,595 B1 | 8/2018 | Farbstein |
| 10,071,350 B2 | 9/2018 | Lewis et al. |
| 10,074,449 B2 | 9/2018 | White et al. |
| 10,139,808 B2 | 11/2018 | Engelbart et al. |
| 10,232,549 B2 | 3/2019 | Hayes et al. |
| 10,243,295 B2 | 3/2019 | Matlack et al. |
| 10,253,195 B2 | 4/2019 | Fenn et al. |
| 10,259,956 B2 | 4/2019 | Chopra et al. |
| 10,350,823 B2 | 7/2019 | Rolland et al. |
| 10,400,057 B2 | 9/2019 | Kwisnek et al. |
| 10,449,714 B2 | 10/2019 | Achten et al. |
| 10,464,031 B2 | 11/2019 | Lewis et al. |
| 10,538,031 B2 | 1/2020 | Chen et al. |
| 10,625,470 B2 | 4/2020 | Sun et al. |
| 10,639,842 B2 | 5/2020 | Leibig et al. |
| 10,639,844 B2 | 5/2020 | Rolland et al. |
| 10,683,381 B2 | 6/2020 | Abell et al. |
| 10,688,770 B2 | 6/2020 | Boydston et al. |
| 10,772,246 B2 | 9/2020 | Speaker et al. |
| 10,792,860 B2 | 10/2020 | Watanabe et al. |
| 10,932,399 B1 | 2/2021 | Nowak et al. |
| 10,947,969 B2 | 3/2021 | Overend et al. |
| 10,948,082 B2 | 3/2021 | Delong |
| 10,968,340 B2 | 4/2021 | Mapkar et al. |
| 10,982,105 B2 | 4/2021 | Fenn et al. |
| 11,028,279 B2 | 6/2021 | Fenn et al. |
| 11,192,632 B2 | 12/2021 | Dovey |
| 11,209,084 B2 | 12/2021 | Dovey |
| 11,220,610 B2 | 1/2022 | Fenn et al. |
| 11,634,599 B2 | 4/2023 | Fenn et al. |
| 2001/0043990 A1 | 11/2001 | Chong et al. |
| 2001/0047058 A1 | 11/2001 | Johnson et al. |
| 2001/0050356 A1 | 12/2001 | Crano et al. |
| 2002/0122928 A1 | 9/2002 | Botrie et al. |
| 2002/0182339 A1 | 12/2002 | Taylor et al. |
| 2003/0004599 A1 | 1/2003 | Herbak |
| 2003/0114590 A1* | 6/2003 | Ohrbom .............. C08F 2/06 525/157 |
| 2003/0165766 A1 | 9/2003 | Zhang et al. |
| 2003/0225239 A1 | 12/2003 | Nakamura et al. |
| 2004/0036200 A1 | 2/2004 | Patel et al. |
| 2004/0046287 A1 | 3/2004 | Andino et al. |
| 2004/0189311 A1 | 9/2004 | Glezer et al. |
| 2004/0220327 A1 | 11/2004 | Cosman et al. |
| 2005/0170285 A1 | 8/2005 | Sugasaki et al. |
| 2005/0171237 A1 | 8/2005 | Patel et al. |
| 2005/0287354 A1 | 12/2005 | Jennings et al. |
| 2006/0046068 A1 | 3/2006 | Barancyk et al. |
| 2006/0051394 A1 | 3/2006 | Moore et al. |
| 2006/0108450 A1 | 5/2006 | Klinkenberg et al. |
| 2007/0141267 A1 | 6/2007 | Sonnenschein et al. |
| 2007/0241482 A1 | 10/2007 | Giller et al. |
| 2007/0270549 A1 | 11/2007 | Szymanski et al. |
| 2009/0065357 A1 | 3/2009 | Glezer et al. |
| 2009/0099600 A1 | 4/2009 | Moore et al. |
| 2009/0126225 A1 | 5/2009 | Jarvis |
| 2009/0175921 A1 | 7/2009 | Gunatillake et al. |
| 2010/0041839 A1 | 2/2010 | Anderson et al. |
| 2010/0076143 A1 | 3/2010 | Yakulis et al. |
| 2010/0113252 A1 | 5/2010 | Bordia et al. |
| 2010/0234485 A1 | 9/2010 | Kohli et al. |
| 2010/0239847 A1 | 9/2010 | Darby et al. |
| 2011/0189591 A1 | 8/2011 | Weiser et al. |
| 2011/0245410 A1 | 10/2011 | Roberts et al. |
| 2011/0287102 A1 | 11/2011 | Gunatillake et al. |
| 2011/0293522 A1 | 12/2011 | Wang et al. |
| 2012/0117822 A1 | 5/2012 | Jarvis |
| 2012/0139160 A1 | 6/2012 | Shade et al. |
| 2012/0159785 A1 | 6/2012 | Pyles et al. |
| 2012/0231232 A1 | 9/2012 | Xu et al. |
| 2012/0244337 A1 | 9/2012 | Gavin |
| 2012/0313056 A1 | 12/2012 | Baran et al. |
| 2013/0073073 A1 | 3/2013 | Pettis |
| 2013/0095253 A1 | 4/2013 | Lindsay et al. |
| 2013/0196124 A1 | 8/2013 | Flores et al. |
| 2013/0237661 A1 | 9/2013 | Brust et al. |
| 2013/0244340 A1 | 9/2013 | Davis et al. |
| 2013/0253084 A1 | 9/2013 | Duggal et al. |
| 2013/0271526 A1 | 10/2013 | Ciampini et al. |
| 2013/0284359 A1 | 10/2013 | Virnelson |
| 2013/0302575 A1 | 11/2013 | Moegele et al. |
| 2013/0344340 A1 | 12/2013 | Senkfor et al. |
| 2014/0012406 A1 | 1/2014 | Cioffi et al. |
| 2014/0017460 A1 | 1/2014 | Xu et al. |
| 2014/0088751 A1 | 3/2014 | Pridoehl et al. |
| 2014/0117586 A1 | 5/2014 | Bonassar et al. |
| 2014/0220354 A1 | 8/2014 | Gao et al. |
| 2014/0323647 A1 | 10/2014 | Voit et al. |
| 2014/0331520 A1 | 11/2014 | Yakulis et al. |
| 2014/0341822 A1 | 11/2014 | Trk et al. |
| 2015/0014881 A1 | 1/2015 | Elsey |
| 2015/0081080 A1 | 3/2015 | Tseng |
| 2015/0099087 A1 | 4/2015 | Reznar et al. |
| 2015/0236261 A1 | 8/2015 | Stoessel et al. |
| 2015/0307738 A1 | 10/2015 | Schmucker et al. |
| 2015/0321434 A1 | 11/2015 | Sterman et al. |

(56) References Cited

U.S. PATENT DOCUMENTS

| | | |
|---|---|---|
| 2015/0352787 A1 | 12/2015 | Humbert et al. |
| 2016/0009029 A1 | 1/2016 | Cohen et al. |
| 2016/0039145 A1 | 2/2016 | Steiner |
| 2016/0083619 A1 | 3/2016 | Anderson et al. |
| 2016/0090507 A1 | 3/2016 | Keledjian et al. |
| 2016/0107391 A1 | 4/2016 | Parish et al. |
| 2016/0152775 A1 | 6/2016 | Tobis et al. |
| 2016/0167299 A1 | 6/2016 | Jallouli et al. |
| 2016/0244181 A1 | 8/2016 | Dobbin |
| 2016/0244980 A1 | 8/2016 | Urban et al. |
| 2016/0250688 A1 | 9/2016 | Coppola |
| 2016/0257067 A1 | 9/2016 | Boydston et al. |
| 2016/0257073 A1 | 9/2016 | Mgele et al. |
| 2016/0271872 A1 | 9/2016 | Sand |
| 2016/0271878 A1 | 9/2016 | Nuechterlein et al. |
| 2016/0290334 A1 | 10/2016 | Overend et al. |
| 2016/0297104 A1 | 10/2016 | Guillemette et al. |
| 2016/0332382 A1 | 11/2016 | Coward et al. |
| 2016/0333152 A1 | 11/2016 | Cook et al. |
| 2016/0374428 A1 | 12/2016 | Kormann et al. |
| 2017/0057160 A1 | 3/2017 | Duty et al. |
| 2017/0066196 A1 | 3/2017 | Beard et al. |
| 2017/0114208 A1 | 4/2017 | Rao et al. |
| 2017/0145202 A1 | 5/2017 | Sparks et al. |
| 2017/0246802 A1 | 8/2017 | Pyzik et al. |
| 2017/0266691 A1 | 9/2017 | Travis |
| 2017/0266877 A1 | 9/2017 | Tyler |
| 2017/0291357 A1 | 10/2017 | Fong et al. |
| 2017/0298979 A1 | 10/2017 | Aston et al. |
| 2017/0321083 A1 | 11/2017 | Fenn et al. |
| 2017/0341296 A1 | 11/2017 | Fenn et al. |
| 2017/0341339 A1 | 11/2017 | Hoebel et al. |
| 2017/0355865 A1 | 12/2017 | Fenn et al. |
| 2017/0369620 A1 | 12/2017 | Abell et al. |
| 2017/0369737 A1 | 12/2017 | Cui et al. |
| 2018/0029291 A1 | 2/2018 | Matzner et al. |
| 2018/0056582 A1 | 3/2018 | Matusik et al. |
| 2018/0059541 A1 | 3/2018 | Campbell et al. |
| 2018/0086002 A1 | 3/2018 | Sun et al. |
| 2018/0100075 A1 | 4/2018 | Chopra et al. |
| 2018/0133952 A1 | 5/2018 | Gu et al. |
| 2018/0133953 A1 | 5/2018 | Achten et al. |
| 2018/0133954 A1 | 5/2018 | Watanabe et al. |
| 2018/0162981 A1 | 6/2018 | Achten et al. |
| 2018/0207863 A1 | 7/2018 | Porter et al. |
| 2018/0215854 A1 | 8/2018 | Paranthaman et al. |
| 2018/0223795 A1 | 8/2018 | Tobin et al. |
| 2018/0244854 A1 | 8/2018 | Drazba et al. |
| 2018/0264719 A1 | 9/2018 | Rolland et al. |
| 2018/0362784 A1 | 12/2018 | Gorin et al. |
| 2019/0001553 A1 | 1/2019 | Robeson et al. |
| 2019/0010370 A1 | 1/2019 | Lin et al. |
| 2019/0030795 A1 | 1/2019 | Jiang et al. |
| 2019/0037969 A1 | 2/2019 | Busbee et al. |
| 2019/0040204 A1 | 2/2019 | Beyer et al. |
| 2019/0118497 A1 | 4/2019 | Kierbel et al. |
| 2019/0152133 A1 | 5/2019 | Busbee |
| 2019/0169449 A1 | 6/2019 | Fenn et al. |
| 2019/0176998 A1 | 6/2019 | Renwick et al. |
| 2019/0217536 A1 | 7/2019 | Honorato et al. |
| 2019/0248065 A1 | 8/2019 | Gorin et al. |
| 2019/0255783 A1 | 8/2019 | Liu et al. |
| 2019/0276689 A1 | 9/2019 | Dhoble et al. |
| 2019/0309733 A1 | 10/2019 | Grishauge et al. |
| 2019/0358983 A1 | 11/2019 | Busbee et al. |
| 2020/0131385 A1 | 4/2020 | Bartow et al. |
| 2020/0164572 A1 | 5/2020 | Bartow et al. |
| 2020/0180220 A1 | 6/2020 | Nelson et al. |
| 2020/0217332 A1 | 7/2020 | Mohr et al. |
| 2020/0276797 A1 | 9/2020 | Zdrojek et al. |
| 2020/0312782 A1 | 10/2020 | Eid et al. |
| 2020/0399487 A1 | 12/2020 | Fenn et al. |
| 2021/0008793 A1 | 1/2021 | Pokrass et al. |
| 2021/0277263 A1 | 9/2021 | Fenn et al. |
| 2022/0185936 A1 | 6/2022 | Abell et al. |
| 2023/0227677 A1 | 7/2023 | Fenn et al. |

FOREIGN PATENT DOCUMENTS

| | | |
|---|---|---|
| CN | 1503721 A | 6/2004 |
| CN | 1723420 A | 1/2006 |
| CN | 1950098 A | 4/2007 |
| CN | 101296958 A | 10/2008 |
| CN | 101896526 A | 11/2010 |
| CN | 102030880 A | 4/2011 |
| CN | 102896923 A | 1/2013 |
| CN | 103160948 A | 6/2013 |
| CN | 103547630 A | 1/2014 |
| CN | 103980449 A | 8/2014 |
| CN | 103991219 A | 8/2014 |
| CN | 104031383 A | 9/2014 |
| CN | 104640958 A | 5/2015 |
| CN | 105313332 A | 2/2016 |
| CN | 107471629 A | 12/2017 |
| CN | 109041563 A | 12/2018 |
| CN | 109247005 A | 1/2019 |
| CN | 110628192 A | 12/2019 |
| CN | 111087792 A | 5/2020 |
| CN | 111391305 A | 7/2020 |
| CN | 111774561 A | 10/2020 |
| DE | 19937770 A1 | 2/2001 |
| DE | 102011003619 A1 | 8/2012 |
| DE | 102011110804 A1 | 2/2013 |
| DE | 102015220699 A1 | 3/2017 |
| EA | 020294 B1 | 10/2014 |
| EP | 0437374 A2 | 7/1991 |
| EP | 2113522 A1 | 11/2009 |
| EP | 2416950 A1 | 2/2012 |
| EP | 2658702 A1 | 11/2013 |
| EP | 2719484 A1 | 4/2014 |
| EP | 2851208 A1 | 3/2015 |
| EP | 3027396 A1 | 6/2016 |
| EP | 3059171 A1 | 8/2016 |
| EP | 3224023 A1 | 10/2017 |
| EP | 3224024 A1 | 10/2017 |
| EP | 3224292 A1 | 10/2017 |
| EP | 3232071 A1 | 10/2017 |
| EP | 3550142 A1 | 10/2019 |
| EP | 3626442 A1 | 3/2020 |
| EP | 3626443 A1 | 3/2020 |
| FR | 3039553 A1 | 2/2017 |
| JP | 03-210364 A | 9/1991 |
| JP | 04-366617 A | 12/1992 |
| JP | 06-026637 B2 | 4/1994 |
| JP | 2001-518408 A | 10/2001 |
| JP | 2002-166460 A | 6/2002 |
| JP | 2003-506228 A | 2/2003 |
| JP | 2011-105906 A | 6/2011 |
| JP | 5085800 B1 | 11/2012 |
| JP | 2013-136724 A | 7/2013 |
| JP | 2014-521797 A | 8/2014 |
| JP | 2015-512816 A | 4/2015 |
| JP | 2016-530430 A | 9/2016 |
| JP | 6253354 B2 | 12/2017 |
| JP | 2018-002896 A | 1/2018 |
| JP | 2018-502197 A | 1/2018 |
| JP | 2019-504919 A | 2/2019 |
| KR | 10-2017-0091121 A | 8/2017 |
| KR | 10-1891560 B1 | 8/2018 |
| KR | 10-2018-0104558 A | 9/2018 |
| RU | 2247087 C2 | 2/2005 |
| RU | 2332265 C2 | 8/2008 |
| RU | 2515549 C2 | 5/2014 |
| RU | 2532190 C2 | 10/2014 |
| RU | 2014113527 A | 10/2015 |
| RU | 2673840 C1 | 11/2018 |
| RU | 2677143 C1 | 1/2019 |
| TW | 201509698 A | 3/2015 |
| TW | 201821248 A | 6/2018 |
| WO | 01/00630 A1 | 1/2001 |
| WO | 01/10630 A1 | 2/2001 |
| WO | 2004/076852 A2 | 9/2004 |

(56) References Cited

FOREIGN PATENT DOCUMENTS

| | | |
|---|---|---|
| WO | 2005/113219 A1 | 12/2005 |
| WO | 2006/073695 A1 | 7/2006 |
| WO | 2007/044735 A2 | 4/2007 |
| WO | 2010/024904 A1 | 3/2010 |
| WO | 2010/117262 A1 | 10/2010 |
| WO | 2013/061060 A1 | 5/2013 |
| WO | 2013/091003 A1 | 6/2013 |
| WO | 2014/173861 A1 | 10/2014 |
| WO | 2015/014381 A1 | 2/2015 |
| WO | 2016/061060 A1 | 4/2016 |
| WO | 2016/085914 A1 | 6/2016 |
| WO | 2016/085976 A1 | 6/2016 |
| WO | 2016/085992 A1 | 6/2016 |
| WO | 2016/106352 A1 | 6/2016 |
| WO | 2016/149032 A1 | 9/2016 |
| WO | 2016/164562 A1 | 10/2016 |
| WO | 2016/182805 A1 | 11/2016 |
| WO | 2016/201103 A1 | 12/2016 |
| WO | 2017/087055 A1 | 5/2017 |
| WO | 2017/092764 A1 | 6/2017 |
| WO | 2017/095658 A1 | 6/2017 |
| WO | 2017/112682 A1 | 6/2017 |
| WO | 2017/130685 A1 | 8/2017 |
| WO | 2017/144461 A1 | 8/2017 |
| WO | 2018/005686 A1 | 1/2018 |
| WO | 2018/007579 A1 | 1/2018 |
| WO | 2018/026829 A1 | 2/2018 |
| WO | 2018/031532 A1 | 2/2018 |
| WO | 2018/049038 A1 | 3/2018 |
| WO | 2018/072034 A1 | 4/2018 |
| WO | 2018/085650 A1 | 5/2018 |
| WO | 2018/106822 A1 | 6/2018 |
| WO | 2018/113875 A1 | 6/2018 |
| WO | 2018/157148 A1 | 8/2018 |
| WO | 2019/089235 A1 | 5/2019 |
| WO | 2019/173511 A1 | 9/2019 |
| WO | 2019/191509 A1 | 10/2019 |
| WO | 2019/204770 A1 | 10/2019 |
| WO | 2019/217848 A1 | 11/2019 |
| WO | 2019/224699 A1 | 11/2019 |
| WO | 2020/107365 A1 | 6/2020 |
| WO | 2020/147567 A1 | 7/2020 |
| WO | 2020/251661 A1 | 12/2020 |

OTHER PUBLICATIONS

"Cross-Linking Thermoplastic Elastomers for Improved Product Performance" Medical Device and Diagnostic Industry, Jun. 1999, 13 pages, Downloaded from https://www.mddionline.com/cross-linking-thermoplastic-elastomers-improved-product-performace Downloaded on Mar. 30, 2020.
Anonymous: "Desmodur (R) VL, Product sheet", COVESTRO, Sep. 10, 2015 (Sep. 10, 2015), pp. 1-3, XP093024448.
Anonymous: "Desmophen (R) 550 U, Technical Datasheet", COVESTRO, Mar. 4, 2021 (Mar. 4, 2021), pp. 1-2, XP093024450.
Asif, M. et al., "A New 3D Printing Technique Using Extrusion of Photopolymer," Conference Paper, Jan. 2017, 11 pages.
Asif, M. et al., "A new photopolymer extrusion 5-axis 3D printer," Additive Manufacturing, 2018, vol. 23, p. 355-361.
Broekaert, "Polyurea Spray Coatings: The Technology and Latest Developments," Paint & Coatings Industry, Mar. 2002, 15 pages.
Canadian Office Action for Application No. 2,968,538, dated Jun. 6, 2018, 4 pages.
Canadian Office Action for Application No. 2,968,549, dated May 7, 2018, 4 pages.
Canadian Office Action for Application No. 2,968,670, dated Jun. 11, 2018, 3 pages.
Covestro: "Desmodur(Registered) VL", Product Data Sheet, Sep. 1, 2015 (Sep. 1, 2015), pp. 1-3, XP055949064.
Covestro: "Desmphen(Registered) 550 U", Technical Data Sheet, Mar. 4, 2021 (Mar. 4, 2021), pp. 1-2, XP055949066.
First Report for Australian Application No. 2015 353618, mailed on Sep. 21, 2017, 6 pages.
First Report for Australian Application No. 2015 353634, mailed on Mar. 5, 2018, 6 pages.
First Report for Australian Application No. 2015 353730, mailed on Mar. 15, 2018, 6 pages.
Formlabs White Paper: 3D Printing with Desktop Stereolithography, An Introduction for Professional Users, Jun. 2015, retrieved from https://archive-media.formlabs.com/upload/Intro-sla-whitepaper-04.pdf, 12 pages.
Hurlbert. "Visual perception: Learning to see through noise", Current Biology, Mar. 2000, vol. 10, No. 6, p. R231-R233.
International Preliminary Report on Patentability for Application No. PCT/US2015/062297, dated May 30, 2017, 7 pages.
International Preliminary Reporton Patentability for Application No. PCT/US2015/062412, dated May 30, 2017, 7 pages.
International Preliminary Reporton Patentability for Application No. PCT/US2015/062445, dated May 30, 2017, 8 pages.
International Search Report and Written Opinion for Application No. PCT/IB2018/056254, mailed on Nov. 19, 2018, 10 pages.
International Search Report and Written Opinion for Application No. PCT/US2015/062297, dated Mar. 4, 2016, 10 pages.
International Search Report and Written Opinion for Application No. PCT/US2015/062412, dated Mar. 2, 2016, 9 pages.
International Search Report and Written Opinion for Application No. PCT/US2015/062445, dated Mar. 1, 2016, 10 pages.
International Search Report and Written Opinion for Application No. PCT/US2019/026672, mailed on Jul. 25, 2019, 12 pages.
International Search Report and Written Opinion for Application No. PCT/US2020/017417, mailed on Jun. 12, 2020, 10 pages.
International Search Report and Written Opinion for Application No. PCT/US2020/017428, mailed on Jul. 29, 2020, 18 pages.
International Search Report and Written Opinion for Application No. PCT/US2020/017441, mailed on Jun. 22, 2020, 8 pages.
International Search Report and Written Opinion for Application No. PCT/US2020/017455, mailed on May 25, 2020, 11 pages.
International Search Report and Written Opinion for Application No. PCT/US2020/017464, mailed on May 25, 2020, 9 pages.
International Search Report and Written Opinion for Application No. PCT/US2020/039557, mailed on Oct. 8, 2020, 13 pages.
Kitano, H. et al., "Unexpected Visible-Light-Induced Free Radical Photopolymerization at Low Light Intensity and High Viscosity Using a Titanocene Photoinitiator," Journal of Applied Polymer Science, 2013, p. 611-618.
Krober, P. et al., "Reactive inkjet printing of polyurethanes," Journal of Material Chemistry, 2009, vol. 19, p. 5234-5238.
Noomen, Proceedings of the XIIIth International Conference in Organic Coatings Science and Technology, 1987, pp. 251.
Quadion LLC, Minnesota Rubber and Plastic (thermoset plastics vs thermoplastics), https://www.mnrubber.com/Design_Guide/5-2.html, Oct. 25, 2014, accessed Nov. 7, 2019 (Year: 2014).
Rios, Orlando, "Evaluation of Advanced Polymers for Additive Manufacturing," CRADA Final Report NFE-14-05252, Oak Ridge National Laboratory, Sep. 8, 2017, 29 pages.
Russia Office Action for Application No. 2017121858, mailed on May 16, 2018, 2 pages.
Russia Office Action for Application No. 2017122126, dated May 16, 2018, 4 pages.
Smith, P. et al., "Reactive inkjet printing," Journal of Materials Chemistry, 2012, vol. 22, p. 10965-10970.
Tillet et al., "Chemical reactions of polymer crosslinking and post-crosslinking at room and medium temperature", Progress in Polymer Science, vol. 36, Issue 2, Feb. 2011, pp. 191-217.
Viscosity of water (https://www.engineersedge.com/physics/water_density_viscosity_specific_weight_ 13146.htm) accessed Apr. 20, 2020, first published Jun. 25, 2014 (Year: 2014).
Zhu et al., "Water-based coatings for 3D printed parts", Journal of Coatings Technology and Research, Jul. 2015, vol. 12, No. 5, p. 889-897.

* cited by examiner

COREACTIVE MATERIALS AND METHODS FOR THREE-DIMENSIONAL PRINTING

This application is a continuation of U.S. application Ser. No. 18/184,138, filed on Mar. 15, 2021, which is a continuation of U.S. application Ser. No. 17/010,039, filed on Sep. 2, 2020, which is a continuation of U.S. application Ser. No. 16/269,277, filed on Feb. 6, 2019, issued as U.S. Pat. No. 11,028,279, which is a continuation of U.S. application Ser. No. 15/528,205, filed on May 19, 2017, issued as U.S. Pat. No. 10,253,195, which is a national stage entry of PCT/US2015/062297, filed on Nov. 24, 2015, which claims the benefit under 35 U.S.C. § 19(e) of U.S. Provisional Application No. 62/158,588, filed on May 8, 2015, and U.S. Application No. 62/083,472 filed on Nov. 24, 2014, each of which is incorporated by reference in its entirety.

This invention was made with government support under Contract Number DE-AC05-00OR22725 awarded by the U.S. Department of Energy and under Cooperative Research and Development Agreement NFE-14-05242. The government has certain rights in the invention.

FIELD

The present invention relates to three-dimensional printing methods and coreactive printing compositions, more particularly to the use of three-dimensional printing compositions comprising coreactive components.

BACKGROUND

In three-dimensional (3D) printing, a composition is laid down in successive layers of material to build a structure from a series of cross-sections of the structure. These layers may be produced, for example, from liquid, powder, paper, or sheet material.

In certain cases, a 3D printing composition is a thermoplastic material, which is extruded through a heated nozzle on to a platform and the nozzle moved with respect to the platform, successively building up layers of thermoplastic material to form a 3D object. After being extruded from the nozzle, the thermoplastic material rapidly cools. Depending in part on the temperature of the underlying thermoplastic layer, the overlying thermoplastic layer may or may not adhere well to the underlying thermoplastic layer. Furthermore, differential thermal expansion can cause stress to be built up in the finished object thereby diminishing the integrity of the object.

SUMMARY

Embodiments of the present disclosure include methods of three-dimensional printing of an object by forming an object using a coreactive printing composition, such as polyurea composition, that is produced from a mixture of at least two coreactive components having coreactive functional groups wherein at least one of the coreactive components comprises a saturated functional group. Also included within the scope of the present disclosure is printed three-dimensional objects formed from layers of a coreactive printing composition, such as a polyurea composition, produced from at least two coreactive components.

According to the present invention, compositions for three-dimensional printing comprise: a first component comprising a first functional group; and a second component comprising a second functional group, wherein the second functional group is reactive with the first functional group; and wherein at least one of the first functional group and the second functional group comprises a saturated functional group.

According to the present invention, compositions for three-dimensional printing comprise: a first component comprising a first functional group; and a second component comprising a second functional group, wherein, the first component comprises a polyamine and the second component comprises a polyisocyanate; the first component comprises a polyalkenyl compound and the second component comprises a polythiol; the first component comprises a Michael addition acceptor and the second component comprises a Michael addition donor; or a combination of any of the foregoing; wherein the composition is characterized by a shear storage modulus G' and a shear loss modulus G", wherein, the initial G"/G' ratio is less than 2; the initial G' is greater than 1,500 Pa; the G' at 6 minutes is greater than 500,000 Pa; and the G" at 6 minutes after mixing is greater than 400,000 Pa; wherein, the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

According to the present invention, compositions comprise: a first component comprising a first functional group; and a second component comprising a second functional group, wherein, the first component comprises a polyamine and the second component comprises a polyisocyanate; the first component comprises a polyalkenyl compound and the second component comprises a polythiol; the first component comprises a Michael addition acceptor and the second component comprises a Michael addition donor; or a combination of any of the foregoing; wherein the composition is characterized by: a viscosity less than 30 cP; a surface tension of 30 mN/m to 50 nM/m; a contact angle on glass of less than 20 degrees; and a contact angle on polyethylene terephthalate of less than 40 degrees.

According to the present invention, three-dimensional object can be formed using a composition provided by the present disclosure.

According to the present invention, methods of three-dimensional printing an object comprise: extruding a first component comprising a first functional group and a second component comprising a second functional group, wherein, the second functional group is reactive with the first functional group; and at least one of the first functional group and the second functional group comprises a saturated functional group; and building a three-dimensional printed object.

According to the present invention, methods of three-dimensional printing an object comprise: depositing by inkjet printing a first reactive component comprising a first functional group; depositing by inkjet printing a second component comprising a second functional group; wherein, the second functional group is reactive with the first functional group; and at least one of the first functional group and the second functional group comprises a saturated functional group; and building a three-dimensional printed object.

According to the present invention, three-dimensional objects can be formed using a method provided by the present disclosure.

BRIEF DESCRIPTION OF THE DRAWINGS

The drawings described herein are for illustration purposes only. The drawings are not intended to limit the scope of the present disclosure.

DESCRIPTION

Figure 1:
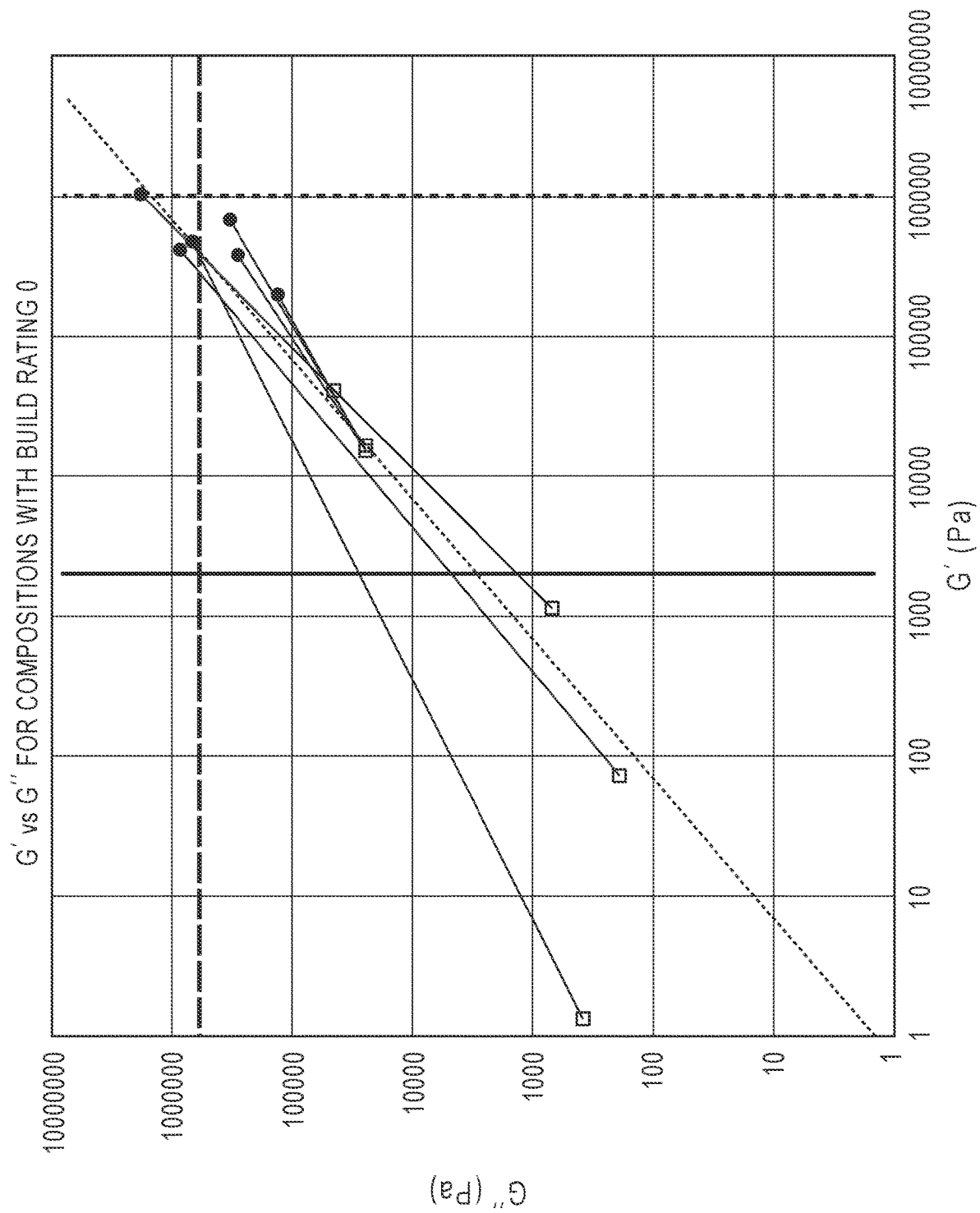
FIG. 1 is a graph showing the dynamic modulus (G' vs. G") of polyurea compositions that did not satisfy desired build criteria.

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

The use of the singular includes the plural and plural encompasses singular, unless specifically stated otherwise. In addition, the use of "or" means "and/or" unless specifically stated otherwise, even though "and/or" may be explicitly used in certain instances.

The term "polymer" is meant to include prepolymer, homopolymer, copolymer, and oligomer.

Embodiments of the present disclosure are directed to the production of structural objects using three-dimensional printing. A three-dimensional object may be produced by forming successive portions or layers of an object by depositing at least two coreactive components onto a substrate and thereafter depositing additional portions or layers of the object over the underlying deposited portion or layer. Layers are successively deposited to build the 3D printed object. The coreactive components can be mixed and then deposited or can be deposited separately. When deposited separately, the components can be deposited simultaneously, sequentially, or both simultaneously and sequentially.

Deposition and similar terms refer to the application of a printing material comprising a thermosetting or coreactive composition and/or its reactive components onto a substrate (for a first portion of the object) or onto previously deposited portions or layers of the object. Each coreactive component may include monomers, prepolymers, adducts, polymers, and/or crosslinking agents, which can chemically react with the constituents of the other coreactive component.

By "portions of an object" is meant subunits of an object, such as layers of an object. The layers may be on successive horizontal parallel planes. The portions may be parallel planes of the deposited material or beads of the deposited material produced as discreet droplets or as a continuous stream of material. The at least two coreactive components may each be provided neat or may also include a solvent (organic and/or water) and/or other additives as described below. Coreactive components provided by the present disclosure may be substantially free of solvent. By substantially free is meant less than about 5 wt %, less than about 4 wt %, less than about 2 wt %, or less than 1 wt % of solvent, where wt % is based on the total weight of a composition.

The at least two coreactive components may be mixed together and subsequently deposited as a mixture of coreactive components that react to form portions of the object. For example, the two coreactive components may be mixed together and deposited as a mixture of coreactive components that react to form the thermosetting composition by delivery of at least two separate streams of the coreactive components into a mixer such as a static mixer to produce a single stream that is then deposited. The coreactive components may be at least partially reacted by the time a composition comprising the reaction mixture is deposited. The deposited reaction mixture may react at least in part after deposition and may also react with previously deposited portions and/or subsequently deposited portions of the object such as underlying layers or overlying layers of the object.

Alternatively, the two coreactive components may be deposited separately from each other to react upon deposition to form the portions of the object. For example, the two coreactive components may be deposited separately such as by using an inkjet printing system whereby the coreactive components are deposited overlying each other and/or adjacent to each other in sufficient proximity so the two reactive components may react to form the portions of the object. As another example, in an extrusion, rather than being homogeneous, a cross-sectional profile of the extrusion may be inhomogeneous such that different portions of the cross-sectional profile may have one of the two coreactive components and/or may contain a mixture of the two coreactive components in a different molar and/or equivalents ratio.

Furthermore, throughout a 3D-printed object, different parts of the object may be formed using different proportions of the two coreactive components such that different parts of an object may be characterized by different material properties. For example, some parts of an object may be rigid and other parts of an object may be flexible.

It will be appreciated that the viscosity, reaction rate, and other properties of the coreactive components may be adjusted to control the flow of the coreactive components and/or the thermosetting compositions such that the deposited portions and/or the object achieves and retains a desired structural integrity following deposition. The viscosity of the coreactive components may be adjusted by the inclusion of a solvent, or the coreactive components may be substantially free of a solvent or completely free of a solvent. The viscosity of the coreactive components may be adjusted by the inclusion of a filler, or the coreactive components may be substantially free of a filler or completely free of a filler. The viscosity of the coreactive components may be adjusted by using components having lower or higher molecular weight. For example, a coreactive component may comprise a prepolymer, a monomer, or a combination of a prepolymer and a monomer. The viscosity of the coreactive components may be adjusted by changing the deposition temperature. The coreactive components may have a viscosity and temperature profile that may be adjusted for the particular deposition method used, such as mixing prior to deposition and/or ink-jetting. The viscosity may be affected by the composition of the coreactive components themselves and/or may be controlled by the inclusion of rheology modifiers as described herein.

It can be desirable that the viscosity and/or the reaction rate be such that following deposition of the coreactive components the composition retains an intended shape. For example, if the viscosity is too low and/or the reaction rate is too slow a deposited composition may flow in a way the compromises the desired shape of the finished object. Similarly, if the viscosity is too high and/or the reaction rate is too fast, the desired shape may be compromised.

For example, the coreactive components that are deposited together may each have a viscosity at 25° C. and a shear rate at 0.1 s$^{-1}$ from 5,000 centipoise (cP) to 5,000,000 cP, from 50,000 cP to 4,000,000 cP, or from 200,000 cP to 2,000,000 cP. The coreactive components that are deposited together may each have a viscosity at 25° C. and a shear rate at 1,000 s$^{-1}$ from 50 centipoise (cP) to 50,000 cP, from 100 cP to 20,000 cP, or from 200 to 10,000 cP. Viscosity values can be measured using an Anton Paar MCR 301 or 302 rheometer with a gap from 1 mm to 2 mm.

Coreactive components that are ink jetted or otherwise deposited separately from each other (not mixed before deposition) may have a viscosity at 25° C. of at least 1 cP, at least 5 cP, or at least 10 cP. The separately deposited coreactive components may have a viscosity at 25° C. that is no more than 20 cP, no more than 30 cP, no more than 40 cP, no more than 50 cP, no more than 75 cP, no more than 100 cP, or no more than 120 cP.

The rate of interlayer crosslinking between successive and adjacent layers of a deposited object can be controlled to facilitate interlayer reaction and thereby improve the interlayer strength. The rate of interlayer crosslinking can be controlled, for example, by adjusting the time between deposition of successive layers, adjusting the temperature, adjusting the concentration of a catalyst, and/or adjusting the components of the composition such as the amount of monomer and prepolymer. A deposited layer may be homogeneous or a deposited layer may be inhomogeneous. For an inhomogeneous layer, a cross-section of the layer may have different chemical compositions. For example to improve interlayer adhesion, a part of a layer may have an excess of a certain coreactive functionality that can then react with an excess of a coreactive functionality of an overlying layer. Similarly, to improve interlayer adhesion, a lower part of a layer may have an excess of a certain coreactive functionality that can then react with an excess of a coreactive functionality of an underlying layer. To improve interlayer adhesion, a tie coating, film, or layer may be applied or deposited over a deposited layer prior to or during deposition of an overlying layer.

The coreactive components may include a first component having at least two functional groups per molecule (referred to as the "A" functional groups) and a second component having at least two functional groups per molecule (referred to as the "B" functional groups), where the A functional groups and the B functional groups are coreactive with each other, are different from each other, and at least one of the two coreactive components includes a saturated functional group.

A "saturated functional group" refers to a functional group of component coreactive component that does not include an unsaturated reactive group, although there may be unsaturation in other (non-reactive) portions of the compound of the coreactive component. An example of a saturated group includes thiol groups and an example of an unsaturated group includes alkenyl and acrylate groups. Examples of saturated functional groups include thiol, hydroxyl, primary amine, secondary amine, and epoxy groups. In certain compositions, a saturated functional group can be a thiol, a primary amine, a secondary amine, or a combination of any of the foregoing. In certain compositions, a saturated functional group can be a thiol, a primary amine, a secondary amine, an epoxy, or a combination of any of the foregoing. Examples of unsaturated functional groups include alkenyl groups, activated unsaturated groups such as acrylate, maleic, or fumaric acid groups, isocyanate groups, acyclic carbonate groups, acetoacetate groups, carboxylic acid groups, Michael acceptor groups, vinyl ether groups, (meth)acrylate groups, and malonate groups.

Compositions provided by the present disclosure can comprise a first component comprising a first functional group, and a second component comprising a second functional group, wherein the second functional group is reactive with the first functional group, and both of the functional groups do not comprise ethylenically unsaturated groups. Examples of ethylenically unsaturated groups include (meth)acrylate groups, Michael acceptor groups, and vinyl ether groups.

In certain compositions provided by the present disclosure the first component and the second component do not include a polyisocyanate and a polyol.

B functional groups may be capable of reacting with the A functional groups at moderate temperature such as less than 140° C., less than 100° C., less than 60° C., less than 50° C., less than 40° C., less than 30° ° C., or less than 25° C. The A and B functional groups may react together at room temperature such as 20° ° C. One or both of the coreactive components may have on average more than two reactive groups per molecule, in which case the mixture of coreactive components comprises a thermosetting composition. Suitable coreactive functional groups are described, for example, in Noomen, Proceedings of the XIIIth International Conference in Organic Coatings Science and Technology, Athens, 1987, page 251; and in Tillet et al., Progress in Polymer Science 36 (2011), 191-217, which is incorporated by reference in its entirety. The reaction between the A groups and the B groups may not involve the elimination of a by-product. Such reactions are often referred to as addition reactions. Examples of suitable coreactive functional groups A and B are listed in Table 1.

TABLE 1

Functional Groups.

| Functional Groups A | Functional Groups B |
|---|---|
| Carboxylic acid | Epoxy |
| Activated unsaturated groups such as acrylate, maleic or fumaric | Primary or secondary amine |
| Isocyanate | Primary or secondary amine |
| Isocyanate | Hydroxyl |
| Cyclic carbonate | Primary or secondary amine |
| Acetoacetate | Primary or secondary amine |
| Epoxy | Primary or secondary amine |
| Thiol | Alkenyl |
| Thiol | Vinyl ether |
| Thiol | (Meth)acrylate |
| Activated unsaturated groups such as acrylate or maleic | Malonate |

A first coreactive component may include compounds having more than one type of functional group A, and the second coreactive component may include components having more than one type of functional group B, such that a 3D-printing material can comprise at least two sets of coreactive A and B groups, wherein at least one coreactive component has a functional group that is saturated. For example, a first coreactive component may have hydroxyl groups and secondary amine groups (i.e. at least two different functional groups) and the second coreactive component may have isocyanate groups. One or both of the coreactive components may optionally comprise a catalyst for the reaction between the A groups and the B groups. The A groups and the B groups may be attached to any suitable compound such as a monomer and/or a prepolymer. Optionally, the A groups and the B groups may be attached to an oligomer, polymer, or prepolymer such as polyester, polyurethane, or acrylic oligomer, polymer, or prepolymer. In general, monomers refer to compounds without repeating units in the backbone, and can be characterized, for example, by a molecular weight less than 600 Daltons, less than 500 Daltons, or less than 400 Daltons. In general, a prepolymer refers to a compound having repeat units in backbone and can be characterized, for example, by a molecular weight from 1,000 Daltons to 20,000 Daltons, from 1,000 Daltons to 10,000 Daltons, or from 2,000 Daltons to 5,000 Daltons.

The functional groups A and B may be terminal groups and/or pendent groups. A coreactive component can have a functionality of two or a functionality greater than two, such as a functionality from 2 to 6. Each functional group of a coreactive component can be the same or certain functional groups of a coreactive component can be different. For example, a coreactive component can have more than one different type of functional group reactive with an isocyanate, such as a primary amine group, a secondary amine group, or a hydroxyl group.

In a composition comprising at least two coreactive component, the first component can comprise a polyamine and the second component can comprise a polyisocyanate; the first component can comprise a polyalkenyl compound and the second component can comprise a polythiol; a the first component can comprise a Michael addition acceptor and the second component can comprise a Michael addition donor; or a combination of any of the foregoing; In a composition comprising at least two coreactive components, the first component can comprise an isocyanate-functional prepolymer; and the second functional group can comprise a primary amine, a secondary amine, a hydroxyl, or a combination of any of the foregoing.

A composition for three-dimensional printing can comprise a first component comprising a first functional group, and a second component comprising a second functional group, wherein the first and second functional groups are reactive with each other, and at least one of the first functional group and the second functional group comprise a saturated functional group. One of the first and second functional groups may be an unsaturated functional group, or both the first and second functional groups may be a saturated functional group. Both the first functional group and the second functional groups are not unsaturated functional groups. A composition provided by the present disclosure may contain additional coreactive components, which may comprise saturated and/or unsaturated functional groups.

The coreactive functional groups can react to form covalent bonds. The reaction between the coreactive functional groups can be catalyzed by a catalyst. In certain compositions, the reaction between the coreactive functional groups does not involve a free-radical initiated reaction. Compositions provided by the present disclosure may be thermoset compositions.

Compositions provided by the present disclosure may include two coreactive components or more than two coreactive components. A reactive component can comprise a combination of reactive components having the same functional group, such as a combination of monomers and prepolymers having the same functional group. An additional coreactive component can comprise a compound having a different functional group reactive with a first functional group or the second functional group. An additional coreactive component can impart an additional property to the composition. For example, the reaction rate of the additional coreactive component with one of the other coreactive components may be rapid and thereby facilitate the ability of a deposited layer to maintain a desired shape before the other components fully cure.

The first component and the second component can be combined in a suitable ratio to form a curable composition. For example, the functional Group A to functional Group B equivalent ratio of a curable composition can be from 1:1 to 1.5:1, from 1:1 to 1.45:1, from 1:to 3:1, from 1.2:1 to 1.5:1, or from 1.2:1 to 1.4:1. A suitable functional Group A to functional Group B equivalent ratio of a curable composition can be, for example, from 2:1 to 1:2, from 1.5:1 to 1:1.5, or from 1.1:1 to 1:1.1.

Compositions provided by the present disclosure can include one or both of the coreactive components such that the ratio of coreactive components in one portion of the object differs from the ratio of coreactive components in another part of the object. In this manner, portions of an object may have differing final compositions. The different compositions may differ by the weight percent of the coreactive compositions, the equivalent ratio of reactive monomers or reactants within the coreactive compositions, the type and/or level of filler, the crosslinking density, and/or properties such as glass transition temperature. Accordingly, one portion of an object produced in the three-dimensional printing may have different material properties such as different chemical, physical, thermal, or material properties than those of another portion of the three-dimensional object.

In addition, one portion of an object may partially react with at least some other coreactive components in an adjacent portion of the object. Such reaction may occur during deposition and/or after the coreactive components are deposited in each adjacent portion, whereby the coreactive components react in part within each adjacent portion and the coreactive components between adjacent portions react. In this manner, the deposited portions of an object may be covalently bound together as the coreactive compositions react between the portions of the object, thereby increasing the physical and structural integrity of the three-dimensional object. For example, unreacted isocyanate and/or amine groups present on the surface of an underlying deposited layer, can react with unreacted groups of a subsequently deposited layer. This increases the strength/integrity of the object by providing reaction between layers of deposited material, in addition to reaction within the same layer.

A printed three-dimensional object can include layers formed from a thermosetting or coreactive composition, such as a polyurea composition, that is produced from at least two printed coreactive components and which may be crosslinked. In the case of polyurea, one of the coreactive components may include an isocyanate-functional prepolymer or oligomer and another coreactive component may include an amine such as a primary or secondary amine. The isocyanate-functional coreactive components may further include isocyanate-functional monomers. The amine containing coreactive component may further include another reactant with functional groups reactive with the isocyanate-functional prepolymer, oligomer, and/or monomer such as hydroxyl groups. Adjacent portions of a printed three-dimensional object may be reacted with some of the coreactive compositions in one or more adjacent portions.

For a polyurea composition, the coreactive components may include an isocyanate-functional component that may include polyisocyanate monomers, prepolymers, oligomers, adducts, polymers, or a blend of polyisocyanates. A prepolymer can be a polyisocyanate which is pre-reacted with a sufficient amount of polyamine(s) or other isocyanate-reactive components such as one or more polyols, so that reactive isocyanate sites on the polyisocyanate remain in the isocyanate-functional prepolymer.

Suitable monomeric polyisocyanates include, for example, isophorone diisocyanate (IPDI), which is 3,3,5-trimethyl-5-isocyanato-methyl-cyclohexyl isocyanate; hydrogenated diisocyanates such as cyclohexylene diisocyanate, 4,4'-methylenedicyclohexyl diisocyanate ($H_{12}MDI$); mixed aralkyl diisocyanates such as tetramethylxylyl diisocyanates, $OCN-C(-CH_3)_2-C_6H_4C(CH_3)_2-NCO$; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate.

Aliphatic isocyanates are particularly useful in producing three-dimensional polyurea objects that are resistant to degradation by UV light. However, in other circumstances, less costly aromatic polyisocyanates may be used when durability is not of significant concern. Examples of monomeric aromatic polyisocyanates include phenylene diisocyanate, toluene diisocyanate (TDI), xylene diisocyanate, 1,5-naphthalene diisocyanate, chlorophenylene 2,4-diisocyanate, bitoluene diisocyanate, dianisidine diisocyanate, tolidine diisocyanate and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

Suitable polyisocyanates also include polyisocyanates prepared from dimers and trimers of diisocyanate monomers. Dimers and trimers of diisocyanate monomers can be prepared, for example, by methods described in U.S. Pat. No. 5,777,061 at column 3, line 44 through column 4, line 40, which is incorporated by reference in its entirety. Dimers and trimers of diisocyanate monomers may contain linkages selected from isocyanurate, uretdione, biuret, allophanate and combinations thereof, such as Desmodur® N3600, Desmodur® CP2410, and Desmodur® N3400, available from Bayer Material Science.

A polyisocyanate can also comprise a polyisocyanate prepolymer. For example, a polyisocyanate can include an isocyanate-terminated polyether diol, an extended polyether diol, or a combination thereof. An extended polyether diol refers to a polyether diol that has been reacted with an excess of a diisocyanate resulting in an isocyanate-terminated polyether prepolymer with increased molecular weight and urethane linkages in the backbone. Examples of polyether diols include Terathane® polyether diols such as Terathane® 200 and Terathane® 650 available from Invista or the PolyTHF® polyether diols available from BASF. Isocyanate-terminated polyether prepolymers can be prepared by reacting a diisocyanate and a polyether diol as described in U.S. Application Publication No. 2013/0344340, which is incorporated by reference in its entirety. The number average molecular weight of an extended isocyanate-terminated prepolymer can be, for example, from 250 Daltons to 10,000 Daltons, or from 500 Daltons to 7,500 Daltons.

A polyisocyanate can include a difunctional isocyanate, a trifunctional isocyanate, a difunctional isocyanate-terminated prepolymer, an extended difunctional isocyanate-terminated prepolymer, or a combination of any of the foregoing.

The amine-functional coreactive component used to produce a three-dimensional polyurea object may include primary and/or secondary amines or mixtures thereof. The amines may be monoamines, or polyamines such as diamines, triamines, higher polyamines and/or mixtures thereof. The amines also may be aromatic or aliphatic such as cycloaliphatics. Examples of suitable aliphatic polyamines include, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotolulene diamine, 2,4'- and/or 4,4'-di amino-dicyclohexyl methane, 5-amino-1,3,3-trimethylcyclohexanemethylamine (isophoronediamine), 1,3-cyclohexanebis(methylamine) (1,3 BAC), and 3,3'-dialkyl-4,4'-diaminodicyclohexyl methanes (such as 3,3'-dimethyl-4,4'-diaminodicyclohexyl methane and 3,3'-diethyl-4,4'-diaminodicyclohexyl methane), 2,4- and/or 2,6-diaminotoluene and 2,4'- and/or 4,4'-diaminodiphenyl methane, or mixtures thereof.

Suitable secondary amines include acrylates and methacrylate-modified amines. By "acrylate and methacrylate modified amines" includes both mono- and poly-acrylate modified amines as well as acrylate or methacrylate modified mono- or poly-amines. Acrylate or methacrylate modified amines can include aliphatic amines.

A secondary amine may include an aliphatic amine, such as a cycloaliphatic diamine. Such amines are available commercially from Huntsman Corporation (Houston, TX) under the designation of JEFFLINK™ such as JEFFLINK™ 754. The amine may be provided as an amine-functional resin. Such amine-functional resins may be a relatively low viscosity, amine-functional resins suitable for use in the formulation of high solids polyurea three-dimensional objects. An amine-functional resin may comprise an ester of an organic acid, for example, an aspartic ester-based amine-functional reactive resin that is compatible with isocyanates; e.g., one that is solvent-free. An example of such polyaspartic esters is the derivative of diethyl maleate and 1,5-diamino-2-methylpentane, available commercially from Bayer Corporation. PA under the trade name DESMOPHEN™ NH1220. Other suitable compounds containing aspartate groups may be employed as well.

An amine-functional coreactive component also may include high molecular weight primary amines, such as polyoxyalkyleneamines. Polyoxyalkyleneamines contain two or more primary amino groups attached to a backbone, derived, for example, from propylene oxide, ethylene oxide, or a mixture thereof. Examples of such amines include those available under the designation JEFFAMINE™ from Huntsman Corporation. Such amines can have a molecular weight from 200 Daltons to 7,500 Daltons, such as, for example, JEFFAMINET D-230, D-400, D-2000, T-403 and T-5000.

An amine-functional co-reactive component may also include an aliphatic secondary amine such as Clearlink® 1000, available from Dor-Ketal Chemicals, LLC.

An amine-functional coreactive component can comprise an amine-functional aspartic acid ester, a polyoxyalkylene primary amine, an aliphatic secondary amine, or a combination of any of the foregoing.

For a polyurea formed from coreactive components comprising an isocyanate and a (meth)acrylate amine reaction product of a monoamine and poly(meth)acrylate, the term "(meth)acrylate" denotes both the acrylate and the corresponding (meth)acrylate. The poly(meth)acrylate may be any suitable poly(meth)acrylate and mixtures thereof. A poly(meth)acrylate can include a di(meth)acrylate, a poly (meth)acrylate can comprise tri(meth)acrylate, or a poly (meth) acrylate can include tetra(meth)acrylate. Suitable di(meth)acrylates include, for example, ethylene glycol, di(meth)acrylate, 1,3-butylene glycol di(meth)acrylate, 1,4-butanediol di(meth)acrylate, 2,3-dimethylpropane 1,3-di (meth)acrylate, 1,6-hexanediol di(meth)acrylate, propylene glycol di(meth)acrylate, dipropylene glycol di(meth)acrylate, tripropylene glycol di(meth)acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxyolated neopentyl glycol di(meth) acrylate, pentanediol di(meth)acrylate, cyclohexane dimethanol di(meth)acrylate, ethoxylated bis-phenol A di(meth) acrylate, and mixtures of any of the foregoing. Examples of tri and higher (meth)acrylates include glycerol tri(meth) acrylate, trimethylolpropane tri(meth)acrylate, ethoxylated trimethylolpropane tri(meth)acrylate, propoxylated trimethylolpropane tri(meth)acrylate, ditrimethylolpropane tetra (meth)acrylate, pentaerythritol tetra(meth)acrylate, ethoxylated pentaerythritol tetra(meth)acrylate, propoxylated pentaerythritol tetra(meth)acrylate, and dipentaerythritol penta(meth)acrylate. Other suitable poly(meth)acrylate oligomers include (meth)acrylate of epoxidized soya oil and urethane acrylates of polyisocyanates and hydroxyalkyl (meth)acrylates. Mixtures of poly(meth)acrylate monomers may also be used, including mixtures of mono, di, tri, and/or tetra (meth)acrylate.

Other suitable poly(meth)acrylates include urethane (meth)acrylates such as those formed from the reaction of hydroxy-functional (meth)acrylate with a polyisocyanate or with an isocyanate-functional adduct of a polyisocyanate and a polyol or a polyamine. Suitable hydroxy-functional (meth)acrylates include 2-hydroxyethyl, 1-methyl-2-hydroxyethyl, 2-hydroxypropyl, 2-hydroxybutyl, 4-hydroxybutyl, and the like. Suitable polyisocyanates include, for example, any of the monomeric or oligomeric isocyanates, or isocyanate prepolymers disclosed herein.

A thermosetting or coreactive composition provided by the present disclosure can be based on thiol-ene chemistry. For example, a thermosetting composition provided by the present invention having thiol-ene functionality may include a polyene coreactive component comprising compounds or prepolymers having terminal and/or pendent olefinic double bonds, such as terminal alkenyl groups. Examples of such compounds include (meth)acrylic-functional (meth)acrylic copolymers, epoxy acrylates such as epoxy resin (meth) acrylates (such as the reaction product of bisphenol A diglycidyl ether and acrylic acid), polyester (meth)acrylates, polyether (meth)acrylates, polyurethane (meth)acrylates, amino (meth)acrylates, silicone (meth)acrylates, and melamine (meth)acrylates.

Examples of suitable polyurethane (meth)acrylates include reaction products of polyisocyanates such as 1,6-hexamethylene diisocyanate and/or isophorone diisocyanate including isocyanurate and biuret derivatives thereof with hydroxyalkyl (meth)acrylates such as hydroxyethyl (meth) acrylate and/or hydroxypropyl (meth)acrylate. Examples of suitable polyester (meth)acrylates are the reaction products of (meth)acrylic acid or anhydride with polyols, such as dials, trials and tetraols, including alkylated polyols, such as propoxylated diols and trials. Examples of suitable polyols include 1,4-butane diol, 1,6-hexane dial, neopentyl glycol, trimethylol propane, pentaerythritol and propoxylated 1,6-hexane diol. Examples of suitable polyester (meth)acrylates include glycerol tri(meth)acrylate, trimethylolpropane tri (meth)acrylate, pentaerythritol tri(meth)acrylate, and pentaerythritol tetra(meth)acrylate. Mixtures of polyurethane (meth)acrylates, and polyester (meth)acrylates may be used.

In addition to (meth)acrylates, (meth)allyl compounds or prepolymers may be used either alone or in combination with (meth)acrylates. Examples of (meth)allyl compounds include polyallyl ethers such as the diallyl ether of 1,4-butane diol and the allyl ether of trimethylol propane. Examples of other (meth)allyl compounds include polyurethanes containing (meth)allyl groups. For example, reaction products of polyisocyanates such as 1,6-hexamethylene diisocyanate and/or isophorone diisocyanate including isocyanurate and biuret derivatives thereof with hydroxy-functional allyl ethers, such as the monoallyl ether of 1,4-butane diol and the diallylether of trimethylol propane can be used.

Isocyanate functionality may be incorporated into a coreactive component in a number of ways. The polyurethane (meth)acrylate or the polyurethane (meth)allyl compound may be prepared in a manner such that the reaction product contains unreacted isocyanate groups. For example, the above-mentioned reaction product of 1,6-hexamethylene diisocyanate and/or isophorone diisocyanate with hydroxyethyl (meth)acrylate and/or hydroxypropyl (meth)acrylate are reacted in an NCO/OH equivalent ratio of greater than 1. Alternately, such reaction products may be prepared such that they are isocyanate free, i.e., NCO/OH equivalent ratio equal to or less than 1, and a separate isocyanate compound such as a polyisocyanate may be included in the coreactive component.

A polythiol coreactive component refers to polyfunctional compounds containing two or more thiol-functional groups (—SH). Suitable polythiol-functional compounds include polythiols having at least two thiol groups including monomers and prepolymers. A polythiol may have ether linkages (—O—), thioether linkages (—S—), including polysulfide linkages (—S$_x$—), where x is at least 2, such as from 2 to 4, and combinations of such linkages.

Examples of suitable polythiols include compounds of the formula $R^1$ (SH)$_n$, where $R^1$ is a polyvalent organic moiety and n is an integer of at least 2, such as from 2 to 6.

Examples of suitable polythiols include esters of thiol-containing acids formed by reacting a thiol-containing acid of formula HS—$R^2$—COOH where $R^2$ is an organic moiety with a polyhydroxy compounds of the structure $R^3$—(OH)$_n$, where $R^3$ is an organic moiety and n is at least 2, such as from 2 to 6. These components may be reacted under suitable conditions to give polythiols having the general structure $R^3$—(OC(O)—$R^2$—SH)$_n$ wherein $R^2$, $R^3$ and n are as defined above.

Examples of thiol-containing acids include thioglycolic acid (HS—CH$_2$COOH), α-mercaptopropionic acid (HS—CH(CH$_3$)—COOH) and β-mercaptopropionic acid (HS—CH$_2$CH$_2$COCH) with poly hydroxy compounds such as glycols, triols, tetraols, pentaols, hexaols, and mixtures thereof. Other suitable polythiols include ethylene glycol bis(thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Certain thermosetting compositions provided by the present disclosure may employ Michael addition reactive components. The reactive components may include primary amine-functional components and acrylate, maleic, or fumaric-functional components. Compounds that are useful primary amine-functional components include polyoxyalkyleneamines containing two or more primary amine groups attached to a backbone, derived, for example, from propylene oxide, ethylene oxide, or a mixture thereof. Examples of such amines include those available under the designation JEFFAMINE™ from Huntsman Corporation. Such amines can have a molecular weight ranging from 200 Daltons to 7500 Daltons, such as, for example, JEFFAMINE™ D-230, D-400, D-2000, T-403, and T-5000. Compounds useful as acrylate functional components include the acrylate functional components listed previously as embodiments of (poly)methacrylate. Compounds useful as maleic or fumaric components include polyesters prepared from maleic anhydride, maleic acid, fumaric acid, or their corresponding $C_{1-6}$ alkyl esters.

A Michael acceptor group refers to an activated alkenyl group such as an alkenyl group proximate to an electron-withdrawing group such as a ketone, nitro, halo, nitrile, carbonyl, or nitro group. Examples of Michael acceptor groups include vinyl ketone, vinyl sulfone, quinone, enamine, ketimine, aldimine, oxazolidine, acrylate, acrylate esters, acrylonitrile, acrylamide, maleimide, alkylmethacrylates, vinyl phosphonates, and vinyl pyridines.

Suitable examples of catalysts for Michael addition chemistries include tributylphosphine, triisobutylphosphine, tri-tertiary-butylphosphine, trioctyl phosphine, tris(2,4,4-trimethylpentyl)phosphine, tricyclopentylphosphine, tricyclohexalphosphine, tri-n-octylphosphine, tri-n-dodecylphosphine, triphenyl phosphine, and dimethyl phenyl phosphine.

Thermosetting compositions used in producing three-dimensional objects can include various additives such as rheology modifiers (e.g., silica or other fillers), flow control agents, plasticizers, stabilizers, wetting agents, dispersing auxiliaries, deformers, and adhesion promoters. In addition, three-dimensional printing of a thermosetting composition can include deposition of a thermosetting composition within a mold to provide temporary structural integrity to the object during the printing process.

Because the thermosetting compositions can have a low viscosity compared to thermoplastic compositions it is possible to use high filler concentrations. The high filler concentrations can be used to modify the properties of the finished object such as the mechanical, thermal, and/or electrical properties of the finished object. Thus, the use of high filler concentrations facilitated by the use of three-dimensional thermosetting compositions can greatly expand the design possibilities of three-dimensional printing. Furthermore, thermosetting compositions can be provided having superior solvent and chemical resistance.

Examples of suitable fillers include fumed silica such as Cabosil® TS720 available from Cabot Corporation and precipitated silica such as Lo-Vel® or Hi Sil® silicas available from PPG Industries. A curable composition provided by the present disclosure can comprise, for example, from 1 wt % to 40 wt % filler, from 1 wt % to 30 wt % filler, from 1 wt % to 25 wt % filler, from 5 wt % to 25 wt % filler, or from 10 wt % to 20 wt % filler, where wt % is based on the total weight of the curable composition. A filler may be included in the A component of a two-part system, may be included in the B part of a two-component system, or a filler may be included in both the A part and the B part.

A filler can be a low density filler characterized by, for example, a specific gravity less than 0.7, less than 0.3, or less than 0.1. Use of a low density filler can provide a three-dimensional printed object having a low specific gravity, such as from 0.8 to 1, or from 0.7 to 0.9.

A filler can be an electrically-conductive filler and can be used to impart electrically conductivity and/or EMI/RFI shielding effectiveness to a three-dimensional printed object. For example, an electrically conductive printed object can be characterized by a sheet resistance less than 0.5 Ω/cm$^2$ or less 0.15 Ω/cm$^2$. For example, an electrically conductive printed object can provide effective EMI/RFI over a frequency range from 1 MHZ to 18 GHz, or a subrange between 1 MHz to 18 GHz.

Suitable fillers also include magnetic fillers and opaque fillers.

Three-dimensional printed objects can be fabricated using the compositions provided by the present disclosure. A three-dimensional printed object can be fabricated by deposited successive layers of a compositions comprising coreactive components. The compositions can be deposited, for example, using extrusion or using inkjet printing techniques.

Extrusion of coreactive components is well known. The coreactive components can be mixed in a barrel head pushed under pressure through a suitably shaped nozzle. The extruded composition or extrusion can be characterized by a cross-sectional profile. The cross-sectional profile can be characterized by a constant ratio the coreactive components or by a variable ratio of the coreactive components, where the ratio can refer to the mole % ratio of the coreactive components, by the equivalents ratio of the functional groups, the wt % ratio of the reactive components, or other useful ratio. An inhomogeneous composition across the cross-sectional profile of an extrusion can be useful to impart different properties to different parts of the profile. For example, it may be useful to impart solvent resistance or electrically conductive properties to the outer portion of a profile. To facilitate adhesion between adjacent or adjoining layers such as underlying or overlying layers, it may be useful to include an excess of one or more of the coreactive functional groups. For example, an top surface or a portion of a top surface of a layer may have an excess of a first coreactive functional group, and a bottom surface or a portion of a bottom surface of an overlying layer may have an excess of a second coreactive functional group, where the first and second coreactive functional groups are reactive with each other. In this way, formation of covalent bonding between the adjoining layers is facilitated and the physical integrity of a finished three-dimensional printed object can be increased.

The rate of the curing reaction between the coreactive components can also be controlled such that the reaction is not complete when a subsequent layer is deposited on an underlying layer. In this way, coreactive components of an overlying layer can react with the coreactive components of an underlying layer to increase the strength between layers. Coreactive thermoset materials with a high degree of crosslinking can also be used to provide high solvent and chemical resistance to the finished part.

Figure 2:
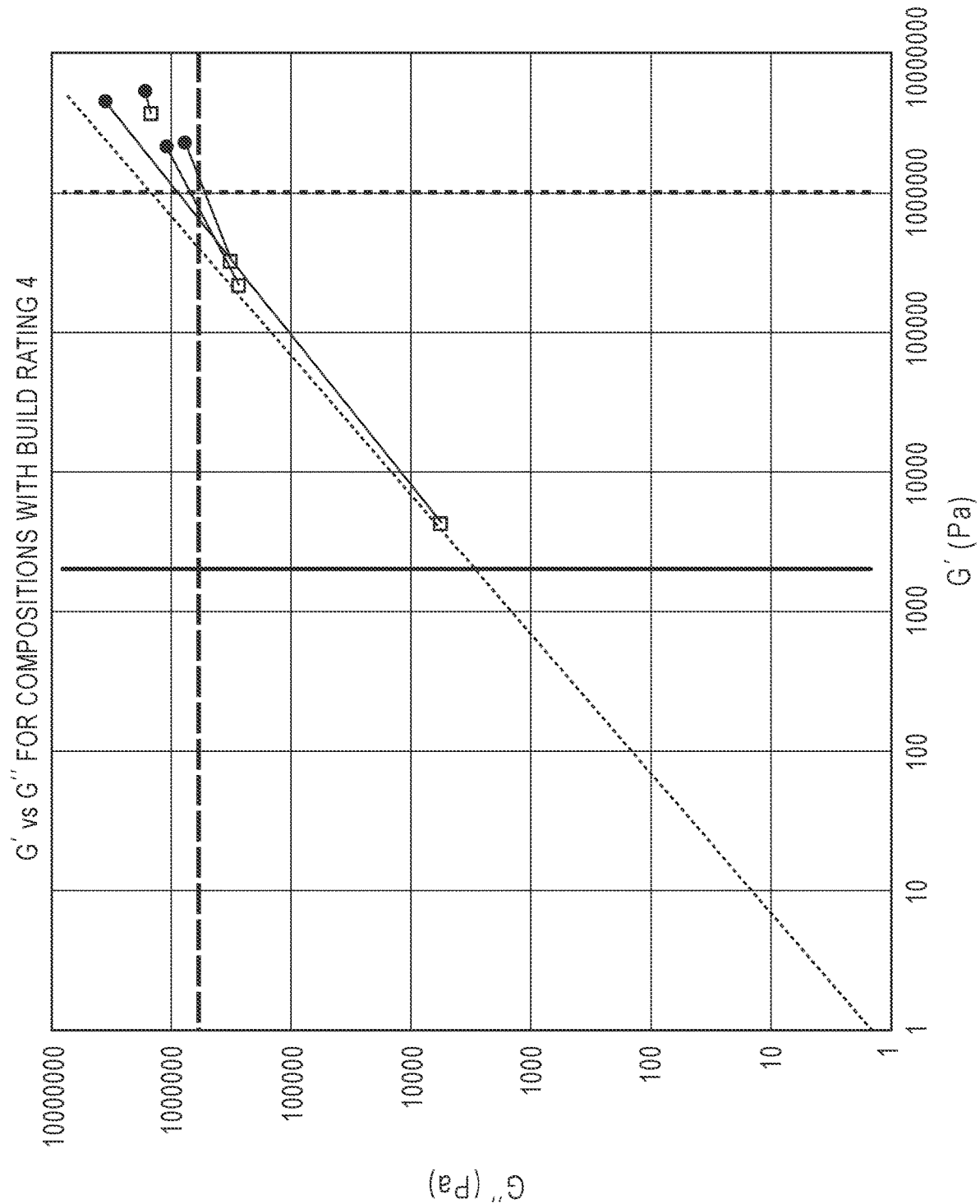
FIG. 2 is a graph showing the dynamic modulus (G' vs. G") of polyurea compositions that met desired build criteria.

The ability of an extruded curable composition to maintain structural integrity and support an overlying layer of the composition was quantified by correlating the dynamic modulus of the curable composition and the desired properties. Desired properties, also referred to as build criteria, include the ability to maintain the shape of a deposited layer, the ability to support one or more overlying layers, and the ability to adhere or co-react with an adjacent layer. The viscoelasticity of a curable composition can be determined using a rotational rheometer to measure the shear storage modulus G' and the shear loss modulus G". For example, the dynamic modulus of polyurea compositions that did not meet the build criteria are shown in FIG. 1 and the dynamic modulus of polyurea compositions that met the build criteria are shown in FIG. 2. In FIGS. 1 and 2, the initial G' and G" of a curable composition immediately after mixing is shown by the open squares and the G' and G" 6 minutes after mixing is shown by the solid circles. A line connects the initial and 6-minute measures for a particular coreactive composition. A G' of 1,500 Pa is shown by the solid vertical line, and a G' of 1,000,000 Pa is shown by the dashed vertical line. A G" of 600,000 Pa is shown by the dashed horizontal line. Coreactive compositions meeting three-dimensional printing build criteria can exhibit the following properties: (1) an initial G"/G' ratio less than 2; (2) an initial G' greater than 1,500 Pa; (3) a 6 min G' greater than 500,000 Pa; and (4) a 6 min G" greater than 400,000 Pa. Coreactive compositions meeting three-dimensional printing build criteria can exhibit the following properties: (1) an initial G"/G' ratio less than 1.5; (2) an initial G' greater than 2,000 Pa; (3) a 6 min G' greater than 106 Pa; and (4) a 6 min G" greater than 600,000 Pa. The initial G' and initial G" refers to the shear storage and shear loss modulus, respectively, immediately after combining the A-functional and B-functional components, such as an isocyanate-functional A component and an amine-functional B component, and the 6 min G' and 6 min G" refer to the shear storage and shear loss modulus, respectively, 6 minutes after the A and B components are combined. The values for the shear storage modulus G' and the shear loss modulus G" can be measured using an Anton Paar MCR 301 or 302 rheometer with a gap set to 1 mm, with a 25 mm-diameter parallel plate spindle, and an oscillation frequency of 1 Hz and amplitude of 0.3%. The tests can be performed under ambient conditions with the temperature of the rheometer plate set to be 25° ° C.

Three-dimensional objects printed according to methods provided by the present disclosure provide benefits over previous 3D printed objects in both the process for producing the object and in the properties of final object. For example, the deposition methods may not require any use of added heat, therefore avoiding the creation of stress buildup in the finished object during cooling as occurs with three-dimensional printing of thermoplastic materials. The coreactive compositions provided by the present disclosure can have sufficiently low viscosity that the compositions may be pumped and printed quickly and accurately. By using coreactive compositions that react fast and remain in place following deposition, improved control over the shape and dimensions of a printed object may be realized. In addition, the coreactive compositions provided by the present disclosure may include materials that provide additional properties to the object such as magnetic or conductive including electrical and/or thermally conductive, properties, and strength. Strengthening components include, for example, carbon fiber, glass fiber, and graphene. Colorants such as pigments or dyes can also be included in a printing composition. For coreactive compositions that crosslink quickly, strength in the printed object allows for rapid addition of further layers on top of the previously printed portion of the object. Another benefit of the disclosed materials and methods is strength as provided in the "z direction" of the printed object, where the x and y direction are the general planes of the building of the three-dimensional object. Traditional three-dimensional printing provides minimal adhesion between layers of the printed object, particularly when thermoplastic materials are used. By providing material that forms covalent crosslinks between successive layers, the final printed object can have increased strength in the z direction.

The use of low viscosity coreactive or thermoset compositions can facilitate deposition at room temperature thereby avoiding the high temperature print heads characteristic of thermoplastic three-dimensional printing apparatus. The use of thermosetting materials can facilitate the use of simple and light weight print heads that can be moved rapidly and precisely and can further simplify the various drive mechanisms.

Depending in part on control of the rheology profile and cure rate of the thermosetting compositions, it is possible to rapidly build parts with high structural integrity. The structural strength between adjacent layers can also facilitate the ability to construct shapes that overhang an underlying layer.

Three-dimensional printed objects can also be fabricated using inkjet printing. Inkjet printing three-dimensional printed objects are generally known in the art. In inkjet printing methods the coreactive components may be deposited sequentially and/or simultaneously. The at least two coreactive can be deposited using separate nozzles. The coreactive components can be deposited on top of each other and/or adjacent to each other. For inkjet printing, a composition can be characterized by a viscosity less than 30 cP; a surface tension of 30 mN/m to 50 nM/m; a contact angle on glass of less than 20 degrees; and a contact angle on polyethylene terephthalate of less than 40 degrees. For inkjet printing the viscosity of the deposited composition can be from about 10 cP to about 30 cP, from about 10 cP to about 20 cP, or from about 5 cP to about 15 cP.

The at least two coreactive components can be deposited from a single nozzle. In such cases the coreactive components can be mixed and deposited before the curing reaction significantly proceeds, or the coreactive components may have, for example, a sufficiently slow curing rate that they remain in liquid form following mixing. The slowly reacting components can be deposited and a catalyst can then be deposited from a separate nozzle to initiate the curing reaction between the two coreactive components. Rather than be deposited as large droplets, the coreactive components can be deposited as a spray. Deposition in the form of a spray can facilitate the ability of the two coreactive components to mix prior to deposition. Because reactive thermoset compositions can have low viscosities, compared to thermoplastic compositions, deposition using sprays can be facilitated.

It should be understood that, where not mutually exclusive, the various features of the embodiments of the present disclosure described, shown and/or claimed herein may be used in combination with each other. In addition, the following Examples are presented to demonstrate the general principles of the methods and compositions provided by the present disclosure. All amounts listed are described in parts by weight, unless otherwise indicated. The invention should not be considered as limited to the specific Examples presented.

EXAMPLES

Example 1

Rheology Characterization

The rheology of three-dimensional printing formulations was determined using an Anton Paar 301 or 302 rheometer. Two-component (A pack: amine; B pack: isocyanate) samples were mixed using either a dual-channel syringe pump (Kd Scientific) or a hand mixing gun (Nordson), and then immediately deposited onto the rheometer to fill the sample gap (1 mL to 2 mL). A disposable sample plate (Anton Paar, Cat. No 4847) was placed on the rheometer and used as the bottom plate in the measurements. A disposable parallel plate spindle with a diameter of 25 mm (PP25) was used for the measurements. The spindle was brought toward the sample immediately after loading, with the gap set at 1 mm. An oscillation measurement (frequency 1 Hz, amplitude 0.3%) was then applied. Rheological parameters (G', G", tan δ, |δ*|) were recorded over time. The tests were performed under ambient condition with the temperature of the rheometer plate set to be 25° C. The polyurea formulations evaluated are provided in Table 2.

TABLE 2

| | A pack | | | B pack | | | NCO/NH |
|---|---|---|---|---|---|---|---|
| Formulation | Amine Component(s) | Particle type | Particle content (wt %) | Isocyanate Component(s) | Particle type | Particule Particle (wt % | Equivalent Ratio |
| A | Desmonphen ® NH1220[1] | None | 0 | Desmodur ® XP 2410[4] | None | 0 | 1.42 |
| B | Desmophen ® NH1220 | Cabosil ® TS720[9] | 2 | Desmodur ® XP 2410 | Cabosil ® TS720 | 2 | 1.42 |
| C | Desmophen ® NH1220 | Cabosil ® TS720 | 4 | Desmodur ® XP 2410 | Cabosil ® TS720 | 4 | 1.42 |
| D | 75 parts Jeffamine ® T5000[2]/25 parts Clearlink ® 1000[3] | Cabosil ® TS720 | 5 | 90 parts PTMEG 2000/IPDI Prepolymer[5], 10 parts of PTMEG650/IPDI Prepolymer[6] | None | 0 | 1.25 |
| E | 70 parts Jeffamine ® T5000/30 parts Clearlink ® 1000 | PPG precipitated Silica[10] | 5 | 80 parts PTMEG 2000/IPDI Prepolymer, 20 parts of PTMEG 650/IPDI Prepolymer | None | 0 | 1.42 |
| F | 55 parts Jeffamine ® T5000/45 parts Clearlink ® NH1220 | None | 0 | 60 parts PTMEG 2000/IPDI Prepolymer, 20 parts of PTMEG 650/IPDI Prepolymer | None | 0 | 1 |
| G | Desmophen ® NH1220 | Cabosil ® TS720 | 5 | Desmodur ® XP 2410 | Cabosil ® TS720 | 5 | 1.42 |
| H | 60 parts Jeffamine ® T5000/40 parts Clearlink ® 1000 | PPG precipitated Silica | 24 | 80 parts PTMEG 2000/IPDI Prepolymer, 20 parts of PTMEG 650/IPDI Prepolymer | None | 0 | 1 |
| I | 64 parts Jeffamine ® T5000/36 parts Clearlink ® 1000 | PPG precipitated Silica | 24 | 60 parts PTMEG 2000/IPDI Prepolymer, 40 parts 650/IPDI Prepolymer | None | 0 | 1.42 |

TABLE 2-continued

| | A pack | | | B pack | | | |
|---|---|---|---|---|---|---|---|
| Formulation | Amine Component(s) | Particle type | Particle content (wt %) | Isocyanate Component(s) | Particle type | Particule Particle (wt % | NCO/NH Equivalent Ratio |
| J | 47 parts Jeffamine ® T5000/53 parts Clearlink ® 1000 | PPG precipitated Silica | 24 | 60 parts PTMEG2000/IPDI Prepolymer, 40 parts of PTMEG 650/IPDI Prepolymer | None | 0 | 1 |

[1]Desmophen ® NH1220, amine-functional aspartic acid ester, available from Bayer Corporation.
[2]Jeffamine ® T5000, polyoxyalkylene primary amine of approximately 5000 MW, available from Huntsman Corporation.
[3]Clearlink ® 1000, aliphatic secondary amine, available from Dorf-Ketal Chemicals, LLC.
[4]Desmodur ® XP 2410, an asymmetric trimer of hexamethylene diisocyanate, available from Bayer Material Science.
[5]PTMEG 2000/IPDI prepolymer, reaction product of isophorone diisocyanate and TERATHANE ™ 2000[7].
[6]PTMEG 650/IPDI prepolymer, reaction product of isophorone diisocyanate and TERATHANE ™ 650[8], as disclosed in U.S. Application Publication No. 2013/0344340, paragraph [0181].
[7]TERATHANE ™ 2000, polythioether diol of approximately 2000 molecular weight, available from Invista.
[8]TERATHANE ™ 650, polythioether diol of approximately 650 molecular weight, available from Invista.
[9]Cabosil ® T5720, fumed silica available from Cabot Corporation.
[10]Lo-Vel ™ 27 available from PPG Industries, Inc.

Graphs showing the dynamic modulus of the deposited polyurea exhibiting Build 0 capability is provided in FIG. 1 and exhibiting Build 4 capability is provided in FIG. 2. Build Capability refers to a subjective assessment of the ability of a composition to produce a successful three-dimensional printed object. Criteria used to assess Build capability include the ability to mechanically support overlying layers, the ability to maintain the deposited shape and dimensions, and the ability to adhere or bond to adjacent layers. A value of 0 represents unacceptable build capability and a value of 5 represents excellent build capability.

The values for which tan δ (G'=G") is 1 is shown as a diagonal line. For values of tan δ greater than 1, the material has a stronger inelastic component and for values of tan δ less than 1, the material has a stronger elastic component. The measurements indicated by the open squares were obtained immediately after the material was deposited on the rheometer (t=0). The measurements indicated by the solid circles were obtained 6 minutes after deposition and when the material had partially cured. Lines connect the measurements for on the same formulation.

It was empirically determined that materials having a shear storage modulus G' and shear loss modulus G" equal to or greater than 106 Pa were sufficiently strong to support overlying build layers and could sufficiently adhere to adjacent layers. This area is represented by the box in the upper right hand corner of the dynamic modulus plot. It was also determined empirically that modulus values that provided a successful build included:

(1) a value of G"/G' less than 1.5;
(2) an initial shear storage modulus G' greater than 2,000 Pa;
(3) a 6 min G' greater than 1,000,000 Pa; and
(4) a 6 min G" greater than 600,000 Pa.

The initial conditions are represented by values of G' and G" below the tan δ line and to the left of the vertical line representing G' greater than 600,000 Pa.

The moduli (shear storage modulus G' and shear loss modulus G") for each of the polyurea formulations included in Table 2 is provided in Table 3.

In the examples, the build capability tests on the formulations shown in Table 2 were performed using a dual channel syringe pump, affixed with a helical static mixer with a 2 mm orifice to dispense the formulation onto the substrate and build. The material was dispensed at a rate of 5 mL/min to 15 mL/min with the volume ratio of the two components adjusted to achieve the stoichiometry listed in Table 3. To assess the build capability of each formulation, a cube with a base approximately 2.5 cm×2.5 cm was built by hand. The build capability was rated on a scale of 0 to 5 with 5 being the best. A build rating of 0 indicated that the material flowed extensively and a three dimensional structure was not produced. A build rating of 4 indicated that many layers could be printed without the cube collapsing or warping, but some limited reflow of the composition occurred after deposition. A 5 build rating indicated that many layers could be printed without the cube collapsing or warping, with no reflow of the composition after deposition.

TABLE 3

Dynamic modulus parameters for the polyurea formulations in Table 2.

| Formulation | G' initial (Pa) | G" initial (Pa) | G' at 6 min (Pa) | G" at 6 min (Pa) | G"/G' (tan ) | Build Capability |
|---|---|---|---|---|---|---|
| A | 389 | 1.351 | 463830 | 705530* | 288 | 0 |
| B | 191 | 73.5 | 413000 | 871000* | 2.60 | 0 |
| C | 701 | 1140 | 1020000* | 1850000* | 0.61* | 0 |
| D | 25354 | 15005* | 373470 | 288510 | 1.69 | 0 |
| E | 25038 | 16595* | 661540 | 349840 | 1.51 | 0 |
| F | 46274 | 40721* | 194260 | 136930 | 1.14* | 0 |

TABLE 3-continued

Dynamic modulus parameters for the polyurea formulations in Table 2.

| Formulation | G' initial (Pa) | G' initial (Pa) | G' at 6 min (Pa) | G" at 6 min (Pa) | G"/G' (tan) | Build Capability |
|---|---|---|---|---|---|---|
| G | 5689.2 | 4304* | 4515600* | 3707700* | 1.32* | 4 |
| H | 323230 | 333310* | 2289900* | 803550* | 0.97* | 4 |
| I | 269730 | 220640* | 2116600* | 1090300* | 1.22* | 4 |
| J | 1512300 | 3757600* | 5328400* | 1655700* | 0.40* | 4 |

The values of the parameters meeting successful build criteria (1)-(4) are identified in Table 3 with an asterisk. Formulations G-J met each of the build criteria (1)-(4).

Whereas particular embodiments of this invention have been described above for purposes of illustration, it will be evident to those skilled in the art that numerous variations of the details of the present invention may be made without departing from the invention as defined in the appended claims.

What is claimed is:

1. A composition for three-dimensional printing, comprising:
   a first component comprising a first functional group; and
   a second component comprising a second functional group, wherein,
      the first component comprises an acrylate compound, and the second component comprises an amine-containing compound;
      the first component comprises an acrylate compound, and the second component comprises a polythiol compound; or
      a combination of the foregoing; and
   a filler present in an amount from 1 wt. % to 40 wt. % based on a total weight of the composition.

2. The composition of claim 1, wherein the acrylate compound comprises a methacrylate, and the amine-containing compound comprises a primary amine-containing compound.

3. The composition of claim 2, wherein the filler comprises one or more thermal fillers.

4. The composition of claim 1, wherein the acrylate compound comprises a silicone (meth)acrylate compound, and the polythiol compound comprises a hexanethiol.

5. The composition of claim 1, comprising less than 5 wt. % solvent, based on the total weight of the composition.

6. The composition of claim 1, wherein the composition is characterized by a viscosity from 5,000 cP to 5,000,000 cP, measured using a rheometer with a gap from 1 mm to 2 mm, a shear rate of 0.1 s$^{-1}$ at a temperature of 25° C.

7. The composition of claim 1, wherein an initial equivalent ratio of the first functional group to the second functional group is from 1.5:1 to 1:1.5.

8. The composition of claim 1, wherein the composition comprises a thermosetting composition.

9. The composition of claim 1, comprising a catalyst, wherein the catalyst catalyzes the reaction between the first functional group and the second functional group.

10. The composition of claim 1, wherein the composition is characterized by a shear storage modulus G' and a shear loss modulus G", wherein,
    the initial G"/G' ratio is less than 2;
    the initial G' is greater than 1,500;
    the G' at 6 minutes is greater than 500,000 Pa; and
    the G" at 6 minutes is greater than 400,000 Pa; wherein,
    the initial G"/G' ratio and the initial G' refer to values measured within 30 seconds after the first component and the second component are mixed;
    the G' and G" after 6 minutes refers to the values measured 6 minutes after the first component and the second component are mixed; and
    the shear storage modulus G' and the shear loss modulus G" are measured using a rheometer with a gap from 1 mm to 2 mm, with a 25 mm-diameter parallel plate spindle, an oscillation frequency of 1 Hz and amplitude of 0.3%, and with a rheometer plate temperature of 25° C.

11. A three-dimensional object formed using the composition of claim 1.

12. The three-dimensional object of claim 11, wherein the three-dimensional object comprises a plurality of layers, wherein adjacent layers forming the three-dimensional object are covalently bonded.

* * * * *